May 5, 1931. H. M. SALISBURY ET AL 1,803,655
DIRECTIONAL STABILIZER FOR AIRCRAFT
Filed Oct. 19, 1929  3 Sheets-Sheet 3

INVENTORS
*Hervey M. Salisbury and
Arthur E. Miller*
BY ATTORNEY

Patented May 5, 1931

1,803,655

UNITED STATES PATENT OFFICE

HERVEY M. SALISBURY, OF WALNUT GROVE, AND ARTHUR E. MILLER, OF SACRAMENTO, CALIFORNIA

DIRECTIONAL STABILIZER FOR AIRCRAFT

Application filed October 19, 1929. Serial No. 400,803.

This invention relates to improvements in airplanes, our principal object being to provide an automatic functioning means, acting on the horizontal-direction rudder of the airplane, for holding the airplane on a level keel and maintaining the same in a set course of flight in a horizontal direction, whether said course be in straight or curved lines. In other words if the airplane should for any reason deviate laterally from its set course, or go into a side slip, it will be automatically restored to its course or brought out of its slip.

A further object of the invention is to provide a structure for the purpose which may be arranged as an attachment, making use of the standard rudder bar and the connections between said bar and the rudder; and which may be readily thrown out of connection with said standard parts when it is not desired to use the automatic control.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
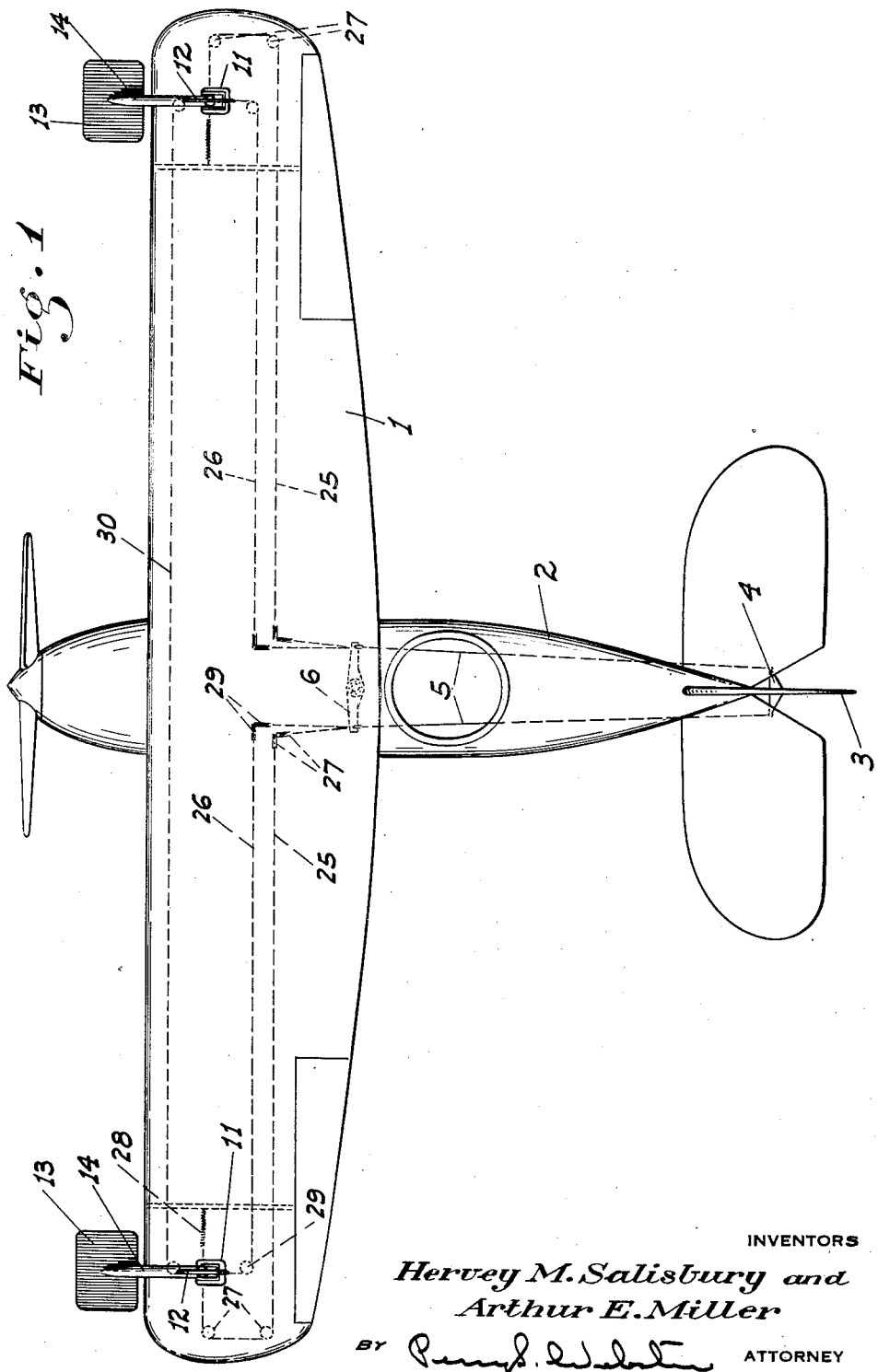
Fig. 1 is a top plan view of an airplane equipped with our improved directional stabilizer.
Figure 2:
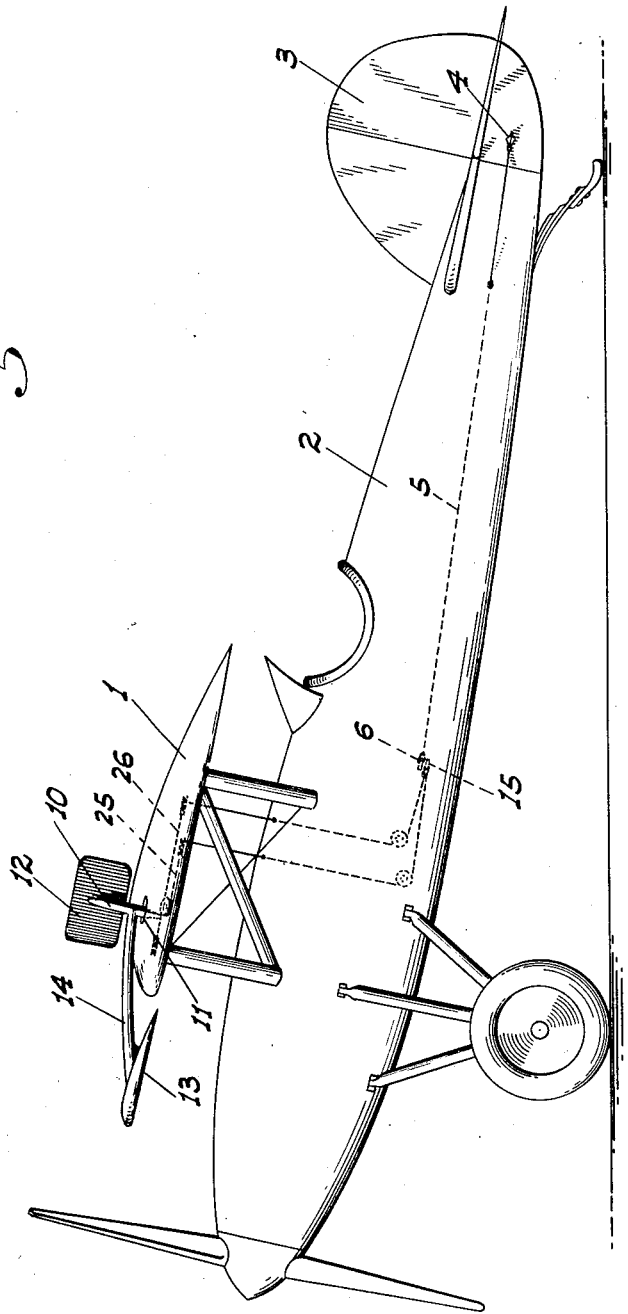
Fig. 2 is a side elevation of the airplane.

Referring now more particularly to the characters of reference on the drawings, the airplane depicted is of the monoplane type having a single wing 1, a fuselage 2 thereunder and the vertically positioned or horizontal-direction control rudder 3 at its rear end. This rudder as usual is provided with a cross arm 4 to which the control cables 5 are connected; said cables extending forwardly to connections with the swivel rudder bar 6 mounted in the cockpit and adapted to be engaged and operated by the feed of the pilot as usual.

Our automatic stabilizer or rudder controlling mechanism is arranged to automatically move the rudder bar to correspondingly move the rudder and is constructed as follows:

Mounted in the wing adjacent each end is a pair of longitudinally spaced brackets 7 supported by the framework 8 of the wing. Turnable in the brackets on a horizontal longitudinal axis is a bearing box 9. In this box is supported, on a horizontal transverse axis, a vertical arm 10 projecting upwardly a certain distance above the upper surface of the wing through a slot 11 in said surface. Longitudinally extending vertical plates 12 are fixed on the arms above the wing while horizontal plates 13 are positioned just ahead of the wing and are rigidly connected to the corresponding arms 10 above the wing by horizontal arms 14. By means of this arrangement it will be seen that if either plate 13 is moved vertically the corresponding arm 10 will be swung on its transverse axis. If, on the other hand, either plate 12 is deflected laterally the arm 10 will likewise be deflected and will rock about the horizontal pivot of the box 9 as an axis.

These movements of the arms 10 are employed to move the rudder bar and consequently the rudder by the following means:

Disposed directly under the rudder bar 6 is a corresponding bar 15, which is mounted in concentric but independently turnable relation with the bar 6 on a vertical shaft 16 which projects through both bars and is journaled in the fuselage as by means of spaced bearing brackets 17. This shaft is vertically movable, a collar 18 under the bar 6 and bearing thereagainst causing the same to be raised when the shaft is raised, while enabling the bar to turn on the shaft.

A compression spring 19 between the upper bracket and the bar 6 tends to move the shaft and the bar down. Vertical movement of this shaft is controlled by means of a hand operated cam 20 journaled in the fuselage and engaging a roller 21 above said cam and mounted in a yoke 22 fixed on the top of the shaft. Depending from the bar 6 are a number of evenly spaced pins 23, concentrically arranged relative to the shaft 16 and adapted to engage correspondingly disposed sockets 24 provided in the bar 15. This arrangement enables the bars to be connected in driving relation with each other and in such a manner that such connection may be made whether the bars are parallel (as when they are in their normal positions and the rudder 3 is in a straight line position) or whether the bar 6 is angled relative to the bar 15 as when the rudder is set at a certain angle so as to turn the airplane in a curved direction.

Figure 3:
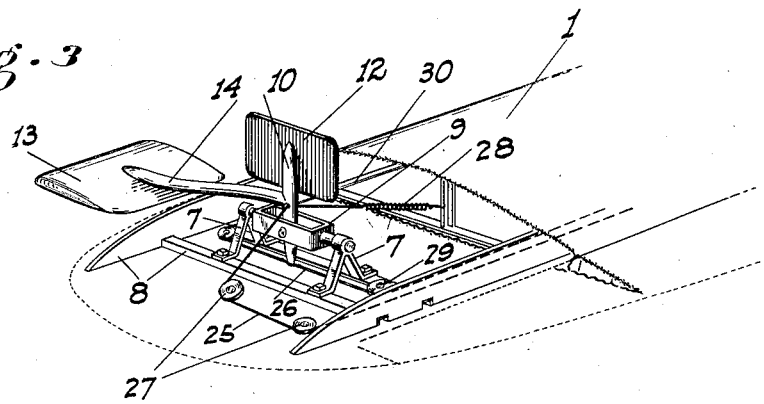
Fig. 3 is a positive view of one of the automatic control units mounted in the wing.
Figure 5:
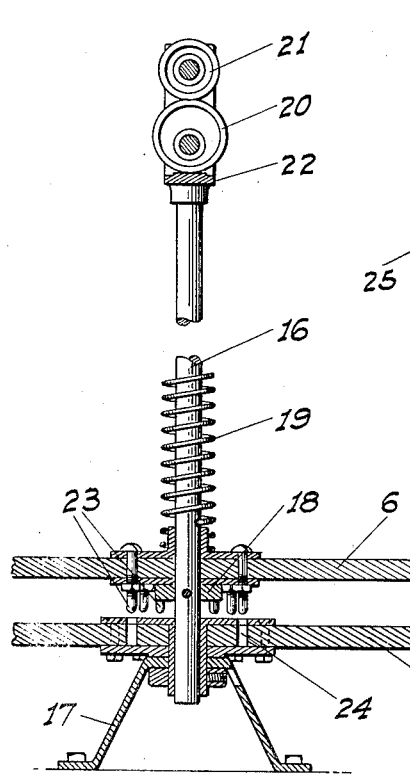
Fig. 5 is a fragmentary enlarged sectional elevation of such mechanism.
Figure 4:
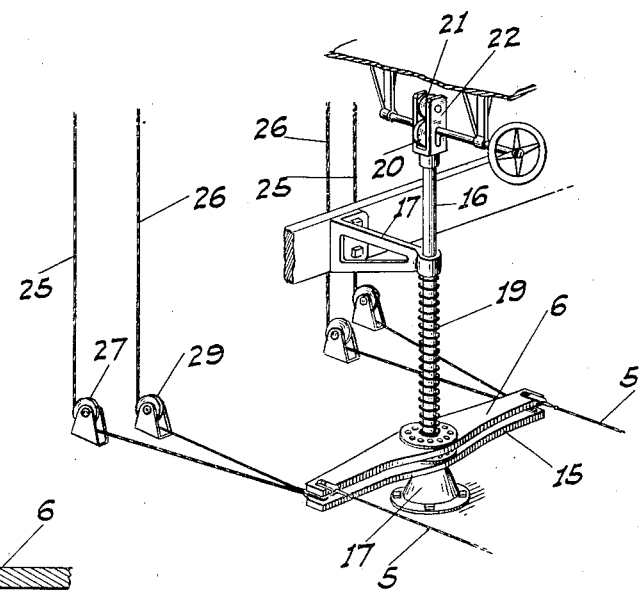
Fig. 4 is a perspective view of that portion of the control mechanism which is mounted in the cockpit of the fuselage.

Pairs of cables 25 and 26 are connected to the ends of the bar 15. The cables 25 extend forwardly and then in opposite directions along the wing, passing over suitable direction changing pulleys 27 so that their outer end portions extend transversely of the wing in line with the arms 10. Such ends of these cables are then connected to the arms above their pivots and on one side as shown in Fig. 3. Tension springs 28 are connected to the arms on the opposite sides and hold the cables taut and equalize the pull on the same.

The cables 26 likewise extend forwardly and then in opposite directions along the wing, passing over suitably disposed direction changing pulleys 29 so that their outer end portions extend lengthwise of the airplane in transverse alinement with and rearwardly of the arms 10, to the lower ends of which said cables are connected also as shown in Fig. 3. Another cable 30 extends across the wing between the arms and terminates in rearwardly extending portions which are connected to the arms 10 on the forward side of the same, so as to equalize the number of said arms and the connected parts.

In operation if the airplane deviates to one side or another from its set course the air pressure against the relatively advanced edge of the wing, to one side of the fuselage, is greater than the pressure on the opposite edge. The corresponding plate 13 is then raised by such greater air pressure, causing the connected cable 26, through its connection with the rudder bar, to pull the rudder so as to counteract this deviation and restore the plane to its proper set course. Similarly if the airplane slips laterally one way or the other, the air pressure against the vertical plates 12 is greater on the side of the plates toward which the craft is slipping than on the opposite side. This movement of the plates 13 and arms 10, through their connection with the rudder bar also causes the rudder to be turned in the proper direction to right the plane.

If it is not desired to use the automatic stabilizing feature it is only necessary to manipulate the cam 20 so as to raise the rudder bar 6 clear of the bar 15 below and to which the automatic control mechanism is connected. The rudder bar 6 may then be operated by foot in the usual manner without interference from the bar 15, and regardless of any movement which the latter may make due to corresponding movements of the plates 12 or 13.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. In an airplane having a wing and a horizontal-direction control rudder, horizontal vertically movable air engaging elements mounted in connection with the wing on both sides of the center of span of the same, vertical longitudinally extending and transversely movable air engaging elements disposed adjacent said first named elements, means connecting the adjacent ones of said elements as a unit, and connections between said means and the rudder for causing the rudder to be turned with the vertical or transverse movement of the elements independently.

2. In an airplane having a wing and a horizontal-direction control rudder, horizontal plates disposed in spaced relation to the wing on both sides of the center of span of the same, vertical plates disposed adjacent the horizontal plates, means connecting adjacent ones of said plates as a unit, supporting means of said connecting means arranged to enable the latter to swing longitudinally or laterally of the airplane with the vertical and lateral movements of the plates respectively and independently, and operating means between said supporting means and the rudder for turning the latter with a movement of said means either longitudinally or laterally.

3. A structure as in claim 2, in which said operating means includes a disconnectable device to enable the rudder to be operated manually without interference from said plates and the associated parts.

4. In an airplane having a wing and a horizontal-direction control rudder, horizontal plates disposed in spaced relation to the wing on both sides of the center of span of the same, vertical plates disposed adjacent the horizontal plates, means connecting adjacent ones of said plates as a unit, supporting means of said connecting means arranged to enable the latter to swing longitudinally or laterally of the airplane with the vertical and lateral movements of the plates respectively and independently, a foot-operated rudder-bar to which the rudder is directly connected, and disengageable connections between the plate supporting means and the rudder bar to swing the latter and turn the rudder with a movement of the supporting means either longitudinally or laterally.

5. In an airplane having a wing and a horizontal-direction control rudder, horizontal plates disposed in special relation to the wing on both sides of the center of span of the same, vertical plates disposed adjacent the horizontal plates, means connecting adjacent ones of said plates as a unit, supporting means of said connecting means arranged to enable the latter to swing longitudinally or laterally of the airplane with the vertical and lateral movements of the plates respectively and independently, a foot-operated rudder-bar to which the rudder is directly connected, a vertical pivot for said bar, another bar disposed in concentric and independently turnable relation to the rudder bar, connections between said other bar and the separate plate supporting means for causing said other bar to be turned on its pivot with either the longitudinal or lateral movement of said supporting means and manually operated.

6. A structure as in claim 5, in which said control means includes pins projecting from one bar and engageable with sockets provided in the other bar, and means for raising and lowering one bar relative to the other to enable the pins to engage or be disengaged from the sockets at will.

7. A structure as in claim 5, in which said control means includes means enabling the bars, when drivingly engaged with each other, to be disposed at any predetermined angle to each other in a horizontal plane.

In testimony whereof we affix our signatures.

HERVEY M. SALISBURY.
ARTHUR E. MILLER.